Oct. 14, 1941.  V. F. ZAHODIAKIN  2,258,668
FASTENING DEVICE
Filed Nov. 22, 1940  3 Sheets-Sheet 1
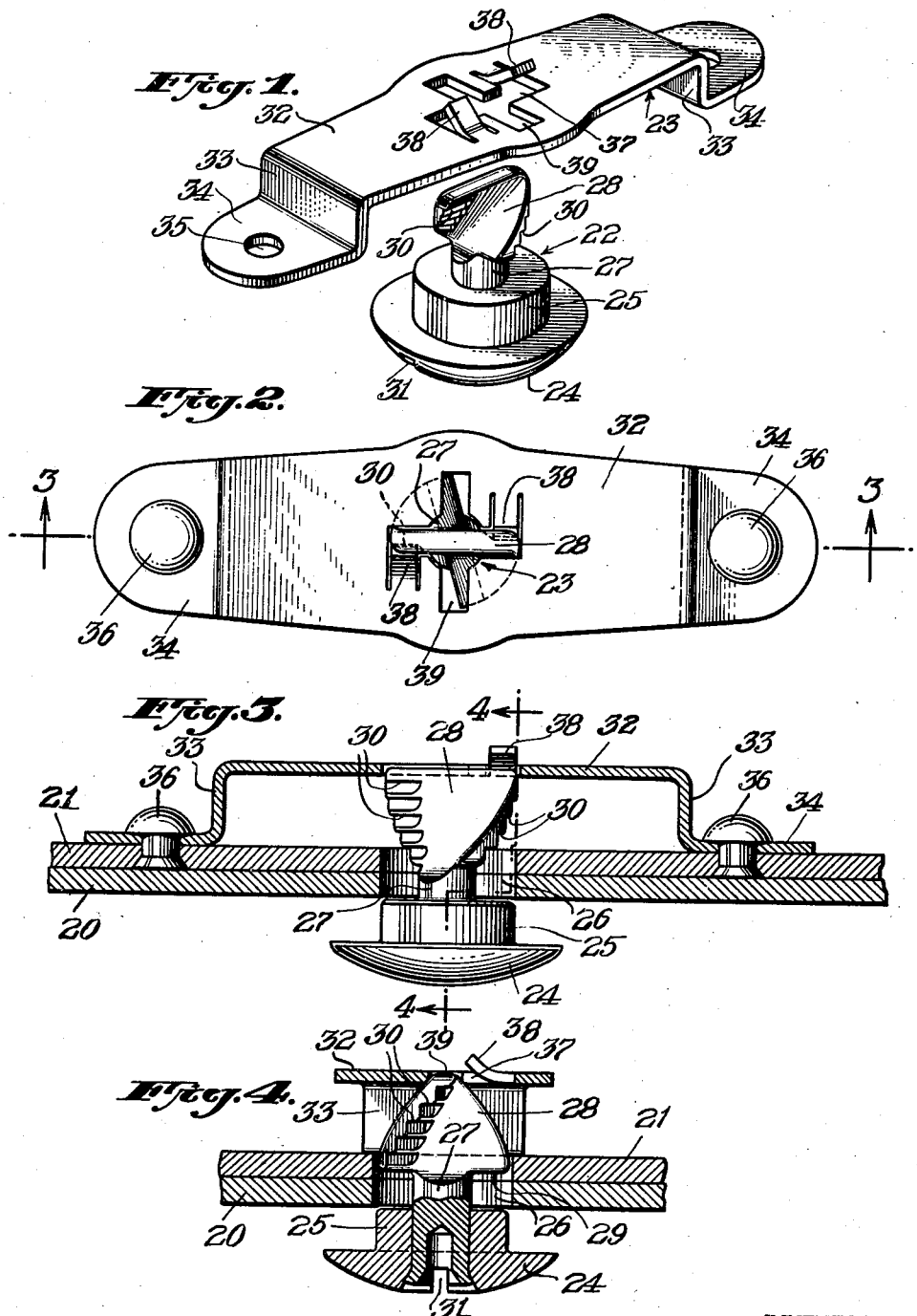
INVENTOR.
VICTOR F. ZAHODIAKIN.
BY George Schlax
ATTORNEY Oct. 14, 1941.  V. F. ZAHODIAKIN  2,258,668
FASTENING DEVICE
Filed Nov. 22, 1940  3 Sheets-Sheet 2
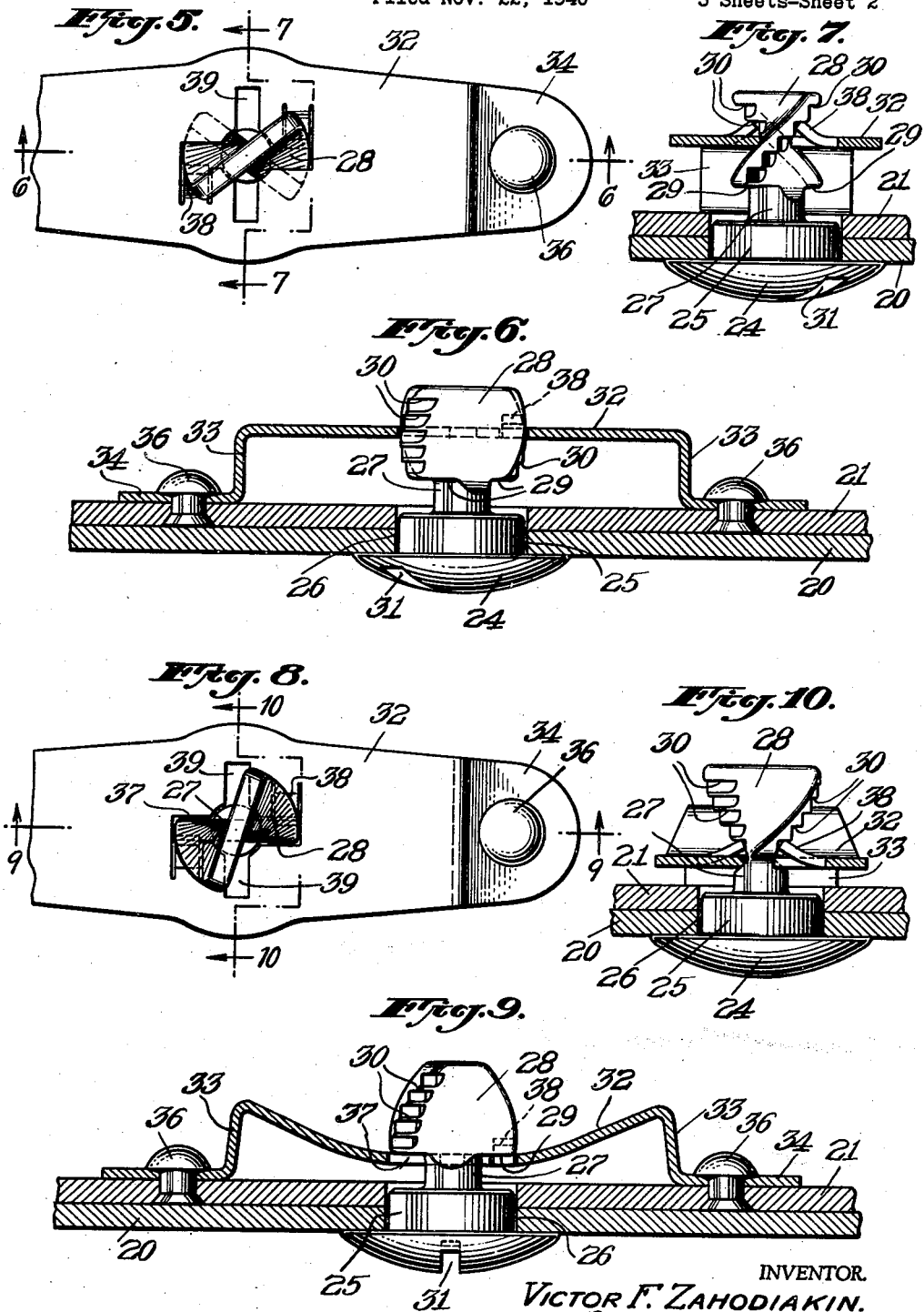
INVENTOR.
VICTOR F. ZAHODIAKIN.
BY George Schleu
ATTORNEY

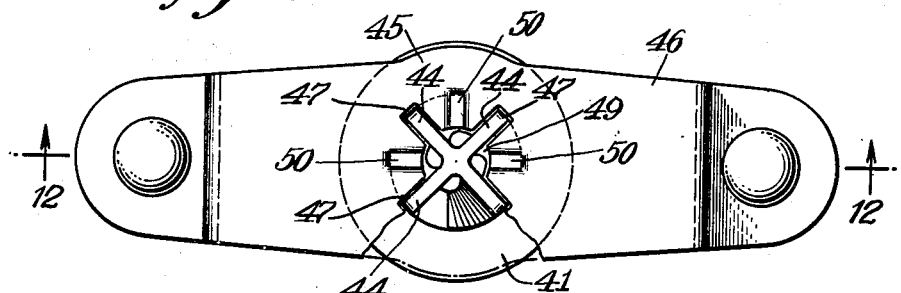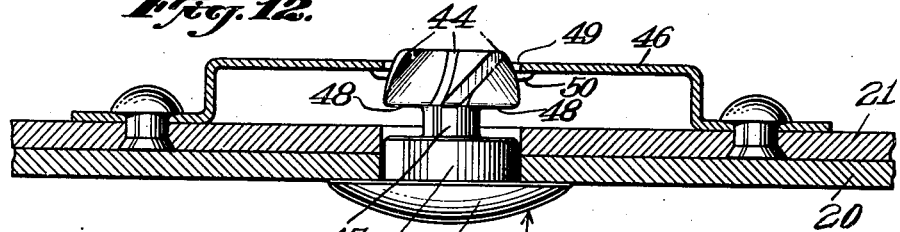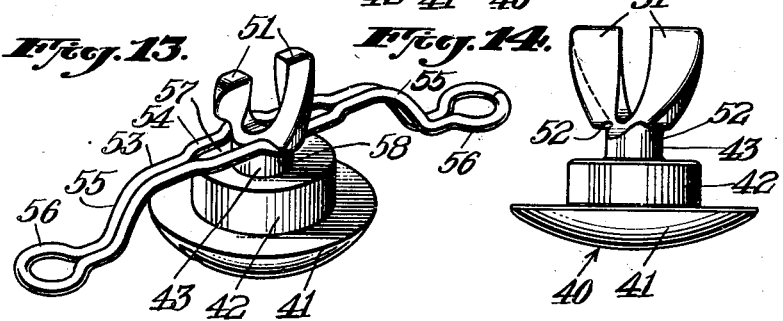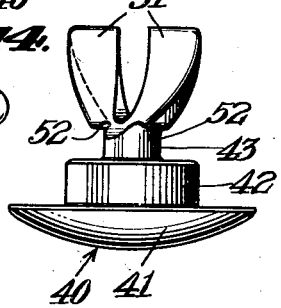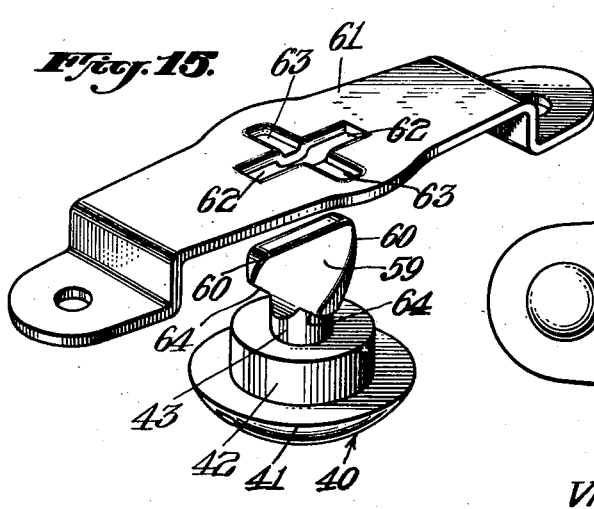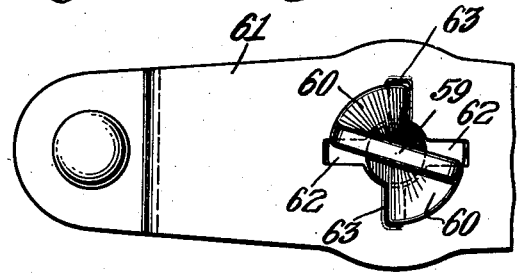
INVENTOR.
VICTOR F. ZAHODIAKIN.
BY George Schlax
ATTORNEY Patented Oct. 14, 1941

2,258,668

UNITED STATES PATENT OFFICE 2,258,668

FASTENING DEVICE

Victor F. Zahodiakin, Maplewood, N. J.

Application November 22, 1940, Serial No. 366,527

12 Claims. (Cl. 85—5)

This invention relates to improvements in fastening devices, and more particularly to fastening devices for releasably clamping and locking together of a plurality of juxtaposed members.

Objects

Among the principal objects which the present invention has in view are: to provide an improved fastening device having means for securely clamping together a plurality of juxtaposed members; to provide an improved fastening device with one element thereof having means for receiving another element for clamping together a plurality of juxtaposed members; to provide one of the juxtaposed members with means whereby a fastening element will engage a portion thereof under pressure and securely clamp the plurality of juxtaposed members together; to apply depressive or tensioning pressure in a spring element by manipulation of a rotary element; to utilize rotation of the rotating element for both depressing the spring element and for advancing the rotating element to a locked position; to take advantage of the greater compressive strength over the tensile strength elements and their constituent parts; to provide cooperating locking seats on one element for engagement by the other element; to provide for locking elements under various or selected tensions; to be enabled to readily disengage the elements from their located position and from each other; to provide for such releasing without sacrificing security of the locking engagement in use; to minimize likelihood of inadvertent releasing; to provide a structure which requires a minimum of exacting manufacturing processes; to provide a structure employing readily manufactured parts; to secure simplicity of construction, installation, minimum cost of manufacture and operation; and to secure other advantages and results as may be brought out in the following description.

Drawings

Figure 1 is a perspective view of my improved fastening device showing the rotating element as disengaged from its resilient member;

Figure 2 is a top plan view of the assembled elements;

Figure 3 is a longitudinal sectional view shown as taken on line 3—3 of Figure 2;

Figure 4 is a transverse sectional view shown as taken on line 4—4 of Figure 3;

Figure 5 is a view similar to Figure 1 showing the rotating element inserted and partially advanced in the resilient member;

Figure 6 is a longitudinal sectional view shown as taken on line 6—6 of Figure 5;

Figure 7 is a transverse sectional view shown as taken on line 7—7 of Figure 5;

Figure 8 is a view similar to Figure 5 showing the rotating member in a further advanced position in the resilient member;

Figure 9 is a longitudinal sectional view shown as taken on line 9—9 of Figure 8;

Figure 10 is a transverse sectional view shown as taken on line 10—10 of Figure 8;

Figure 11 is a top plan view of a modified form of construction of the rotating member;

Figure 12 is a longitudinal sectional view shown as taken on line 12—12 of Figure 11;

Figure 13 is a perspective view of a further modified form of construction of co-engaging fastening elements;

Figure 14 is a side elevation of the rotating member of the modification shown in Figure 13;

Figure 15 is a perspective view similar to Figure 1 showing a further modification of co-engaging fastening elements; and Figure 16 is a plan view of the modification of Figure 15 showing the elements in locked position.

Description

Referring now more particularly to Figures 1 to 10 inclusive, there is shown a preferred embodiment of the invention of my improved fastening device, and it is used with respect to a plurality of juxtaposed members. By way of illustration, the said juxtaposed members are represented as plates, one of which, for convenience, may be termed the main plate 20, such as a part of a body member in the construction of aeroplanes, automobiles, buildings and so forth and the other member 21, a complementary plate such as covered plate or other part which in use is desired to be securely held flatwise upon and secured to the main plate 20. It is to be understood that although only two such juxtaposed members or plates are shown, any number may be employed and securely clamped together in accordance with the invention herein disclosed.

The fastening device comprises essentially two co-engaging fastening elements, of which one is herein designated a rotating element 22 and the other is designated a resilient bridge or spring element 23. These elements are separable one from the other for separating the members, and are to be assembled in co-engaging relationship after the members are assembled and for purposes of retaining those members in engaging and juxtaposed position. Said rotating element is in the nature of a stud with a helical blade suitably shouldered for locking purposes, and the resilient element is in the nature of a bridge having an opening for receiving the said helical blade and likewise suitably shouldered for engaging and retention of the shoulders of the rotating element with the parts assembled.

Said rotating element is illustrated as provided with an enlarged head 24 from which projects in a co-axial location a neck portion 25 which is preferably cylindrical and adapted to enter a correspondingly shaped hole 26 provided in the juxtaposed members to be clamped. Said head 24 is larger than hole 26 and when the parts are assembled will engage flatwise against the plate member for limiting inward movement of the rotating element with respect to the plate members. Likewise co-axial with the head 24 and its neck portion 25, is a stem portion 27 projecting upwardly from the said neck. Merely as a convenient means of manufacture, the said stem 27 is constructed as a separate entity from the head and neck, inserted in a central hole in the head and neck and riveted in place so as to be integral therewith. While this specific mode of fabrication is illustrated and described, it may be varied as found desirable or expedient, it being the purport of the construction to provide an integral assembly of head, neck and stem. At the upper end of the stem, the same is provided with blades 28, which, at their bottoms, or ends towards the head, are directed radially outward preferably in alinement one with the other and perpendicular to the axis of the stem, thereby providing bottom shoulders 29. The blades project in a helix upwardly from the end of the stem, each helix preferably making substantially a quarter turn, so that the upper ends of the blades are aligned in a direction diametrically transverse to the stem and at right angles to the direction of projection of the bottom shoulders 29. On the underside of each helical blade are preferably provided a plurality of steps or shoulders 30, those shoulders each being in planes normal to the axis of the stud. The upper side of the helical blades are preferably smooth so as to provide a cam-like or sliding surface. The stud is intended to be rotated by an operator to advance the helix with respect to the resilient element and to lock the helix by engagement of one of said shoulders with a co-engaging shoulder of the resilient member, the said rotating element likewise being rotatable for releasing such engagement when so desired by the operator. A suitable formation for tool engagement with the head may be provided, and by way of example, the said head 24 and lower end of stem 27 therein are shown provided with a transverse saw-slot 31 as an acceptable mechanical expedient for reception of a screw driver as the particular operating tool.

The co-engaging fastening element specifically identified above as a resilient element or spring bridge 23, is preferably a stamping of spring metal having a bendable resilient mid-portion 32 with offset legs 33 at the ends thereof and upwardly directed foot portions 34 therebeyond enabling the foot portions to be riveted as through apertures 35 therein to one of the aforesaid juxtaposed members, for instance member 21, by suitable fastening means such as rivets 36. The construction thus described situates the mid-portion 32 of the resilient element or bridge in parallel spaced relationship from the said plate member, and the assembly is made in such manner that the center of this spaced mid-portion 32 of the bridge is directly over the hole 26 of said member. Said mid-portion 32 of the resilient element is apertured at its center in appropriate manner and location to receive the end of the rotating element or helical blades thereof and permit the blades to pass upwardly therethrough with a simultaneous rotation of said blades. As here shown, the said resilient bridge element is slotted longitudinally, as at 37 for the purpose just mentioned. The slot is a length comparatively or slightly greater than the span of the upper edge of the blades and has a width substantially equal to or slightly greater than the thickness of the said blades. Furthermore, from opposite sides and opposite ends of the said slot 37, the metal is formed as inwardly and upwardly sloping tongues or blade detaining means 38, 38. These tongues being stamped from resilient metal will likewise have a degree of resiliency, and since they slope upwardly, will respond to upward deflection, but will not be able to bend downwardly when the blades are in the slot for lack of space to accommodate the increased length between the tongues and blade necessary to straighten out the said tongues. The tongues will accordingly act as detents to prevent downward movement of the blades but will admit upward movement of the blades after the manner of a pawl and ratchet. The situation of the detents or tongues 38 is such that they engage the series of steps or shoulders 30 on the underside of the blades, and by virtue thereof the depressive tension applied to the resilient bridge may be varied from the least amount of tension exerted when the tongues engage the uppermost shoulder to the greatest tension when the tongues underlie the bottom shoulder, to suit the desires of the operator or to meet the requirements of use.

Since the construction described does not admit reverse rotation of the rotating element, other means are provided for releasing the co-engaging elements. As here shown, the resilient element is provided with a transverse slot 39 crossing the aforementioned longitudinal slot 37 each midway of the other. This slot 39 is of substantially the same length and width as the aforementioned longitudinal slot 37, but does not have any tongues or detents associated therewith. Consequently, the blades may pass through this transverse slot freely for releasing purposes. In operation it will be understood that the release of the co-engaging fastening elements is obtained by rotating the element to its position where the under-shoulder 29 of the blades passes upwardly over the detents 38 and down over the upper sides thereof into registration with the transverse slot 39. When the blades arrive at such position, they will pass through said slot and the elements are released.

In the modification of Figures 11 to 16 are shown constructions involving essential features above described both as to structure and function, except they do not provide for variable tensioning. In the modifications, the blades are inserted and rotated until the under shoulders thereof overlie the bridge. The locking or detent means is accordingly also modified to be effective with respect to the single locked position. In each instance, therefore, of the modified constructions the mid-portion of the bridge next the opening for the blades is shown with depressions or blade detaining means for the under shoulder to seat itself by continued rotation thereto after arriving above the bridge. These depressions will be identified with reference numerals as each modification is described.

In Figures 11 and 12, the rotating or stud element 40 is shown with head 41, neck portion 42 and stem 43 substantially as described in the previous views. Instead of two blades, however, this modification shows four blades 44 arranged in diametrically opposed pairs and the pairs of blades at ninety degrees disposition with respect to each other. The offset mid-portion 45 of the resilient bridge element 46 of this showing is suitably provided with crossing slots 47, 47 to receive the four blades. The blades are all correspondingly helical and when rotated will advance through the slots until their under shoulders 48 ride upon the upper face of the bridge. Intermediate of the several slots and symmetrically arranged with respect to an enlargement of the slots or central opening 49 in the bridge, are socket depressions or blade detaining means 50 for receiving and seating the several shoulders of the blades. The side edges of these depressions slope sufficiently to permit tool-enforced rotation of the stud element to force the blade shoulders out of the depressions and then the operator merely turns the rotatable element until the shouldered ends of the blades again register with the slots for separating the co-engaging fastening elements. Releasing rotation from the locked position of the shoulders seating in the depressions, in this instance, as well as in the following modifications, may be either clockwise or counter-clockwise.

In the modifications of Figures 13 and 14, the stud or rotating element is shown bifurcated at its upper end between the diametrically opposed blades 51. Those blades are, however, helical as before, and provide bottom shoulders 52. The bridge or resilient element 53 in this instance is shown fabricated of resilient spring wire, providing an offset middle portion 54, offsetting or leg portions 55 and outwardly extending foot portions 56 similar to the preceding showings. The fabrication of wire enables the longitudinal slot 57 to be formed by appropriate separation of the strands of the wire, and depressions or blade detaining means 58 for seating the stud shoulders are formed by downward deflections in those strands midway of the length of the slot.

In the modification of Figures 15 and 16, the construction is closely similar to that of Figures 11 and 12 except that the stud or rotating element 59 utilizes only one pair of diametrically opposed helical blades 60, 60 similar to the showing of Figures 1 to 10, and the bridge or resilient element 61 accordingly has but a single longitudinal slot in its mid-portion 62 with depressions or blade detaining means 63, 63 in a cross formation with respect thereto to receive the under shoulders 64, 64 of the blades.

Obviously other detail changes and modifications may be made in the construction and use of my improved fastening device without departing from the spirit and scope of the invention, and I do not wish to be understood as limiting myself to the exact construction or operation shown or described except as set forth in the following claims when construed in the light of the prior art.

I claim:

1. A fastening device comprising co-engaging elements, one of said elements being resilient and slotted, the other said element being rotatable and having a head at one end and helical blades at its other end for entry in said slotted element, and a stepped shoulder on each of said blades for locking engagement with the slotted element upon advancing rotation of the helical blades.

2. A fastening device comprising co-engaging elements, one of said elements being resilient and slotted, the other said element being rotatable and having a head at one end and helical blades at its other end for entry in said slotted element, said blades each being provided with a plurality of stepped shoulders for locking engagement with the slotted element upon advancing rotation of the said blades.

3. A fastening device comprising co-engaging elements, one of said elements being resilient and slotted, the other said element being rotatable and having a head at one end and helical blades at its other end for entry in said slotted element, said blades each being provided with a plurality of shoulders for locking engagement with the slotted element upon advancing rotation of the said blades, and said slotted element having locking means engageable by said shoulders.

4. A fastening device comprising co-engaging elements, one of said elements being resilient and slotted, the other said element being rotatable and having a head at one end and helical blades at its other end for entry in said slotted element, said blades each being provided with a plurality of shoulders for locking engagement with the slotted element upon advancing rotation of the said blades, and said slotted element having locking detents engageable by said shoulders.

5. A fastening device comprising co-engaging elements, one of said elements being resilient and slotted, the other said element being rotatable and having a head at one end and helical blades at its other end for entry in said slotted element, said blades each being provided with a plurality of shoulders for locking engagement with the slotted element upon advancing rotation of the said blades, and said slotted element having locking blade engaging means engageable by said shoulders.

6. A fastening device comprising co-engaging elements, one of said elements being resilient and slotted, the other said element being rotatable and having a head at one end and helical blades at its other end for entry in said slotted element, said slotted element having tongues sloping upwardly inward with respect to one slot, and stepped shoulders on the underside of said helical blades engageable with said tongues for preventing backward rotation of the blades with respect thereto.

7. A fastening device comprising co-engaging elements, one of said elements being resilient and slotted, the other said element being rotatable and having a head at one end and helical blades at its other end for entry in said slotted element, said slotted element having tongues sloping upwardly inward with respect to one slot, and stepped shoulders on the underside of said helical blades engageable with said tongues for preventing backward rotation of the blades with respect thereto, said resilient element having transverse to the slot provided with tongues another slot without tongues through which the helical blades may return for separating the rotating element from the other element.

8. A fastening device comprising co-engaging elements, one of said elements being resilient and slotted, the other said element being rotatable and having a head at one end, and being provided with a plurality of helical blades at its other ends for entry in said slotted element, and blade detaining means in the upper face of the slotted element to which the helical blades may be rotated, said helical blades each having shoulders on its under edge for seating into said blade detaining means and thereby locking the rotatable element with respect to the resilient element.

9. A fastening device comprising co-engaging elements, one of said elements being of spring wire formation forming a bridge of two strands of the wire, said wires being separated at a midpart of said bridge portion for providing a slot therebetween, the other said element being rotatable and being provided with a plurality of helical blades insertable through said slot and each having radial shoulders at its under edge, said strands of wire at a part of the said slot having blade detaining means to receive said shoulders for locking the rotatable element with respect to the resilient element.

10. A fastening device comprising co-engaging elements, one of said elements being resilient and slotted, the other said element having a head at one end and a helical blade at its other end for entry in said slotted element, said blade being provided with a plurality of stepped shoulders for locking engagement with the slotted element upon advancing rotation of said blade, and said slotted member having blade detaining means engageable by said shoulders, and said blade having an undercut shoulder whereby said headed element may be disengaged from the slotted member.

11. A fastening device comprising co-engaging elements, one of said elements being resilient and slotted, the other said element having a head at one end and a helical blade at its other end for entry in said slotted element, said blade being provided with a plurality of stepped shoulders for successive locking engagement with the slotted element upon advancing rotation of said blade, the slotted member having blade detaining means engageable by said shoulders, said slotted member having a transverse slot, and said blade having an undercut shoulder whereby said headed element may be disengaged from the slotted member upon alining the undercut shoulder in registration with the undercut slot.

12. A fastening device comprising co-engaging elements, one of said elements being resilient and slotted, the other said element comprising a stud having a head, neck and stem, said stem at its upper end providing a helical blade for entry in said slotted element, said blade projecting upwardly in a helix from said stem and being provided with a plurality of stepped shoulders in a plane normal to the axis of the stud for successive locking engagement with the slotted element upon advancing rotation of said blade, and said slotted member having blade detaining means engageable by said shoulders.

VICTOR F. ZAHODIAKIN.